W. B. Coates,
Green Corn Cutter.

No. 14,855.      Patented May 13, 1856.

Witnesses:
Henry Howson
William E. Walton

Inventor.
William B. Coate.

UNITED STATES PATENT OFFICE.

WM. B. COATES, OF PHILADELPHIA, PENNSYLVANIA.

MACHINE FOR CUTTING GREEN CORN FROM THE COBS.

Specification of Letters Patent No. 14,855, dated May 13, 1856.

*To all whom it may concern:*

Be it known that I, WILLIAM B. COATES, of the city of Philadelphia and State of Pennsylvania, have invented a new and Improved Apparatus for Cutting the Kernels from Green-Corn Cobs; and I do hereby declare that the following is a full, clear, and exact description of the same, reference being had to the accompanying drawing and to the letters of reference marked thereon.

My invention consists in submitting to the action of yielding cutters arranged in such a manner, as to present a circular passage, and having sharp cutting points, cobs of green corn, by sticking their ends on prongs at the end of the spindle, turning the latter rapidly, and causing it to force the adhesive cob into the space between the elastic cutters, that the points of the same may so operate on the roots of the kernels as to cut them off from the husk effectually and rapidly. The apparatus is so arranged that the kernels may be cut from the thicker and thinner portions of a cob alike, and from cobs of various sizes.

In order to enable others skilled in the art to make and use my invention I will now proceed to describe its construction and operation.

Figure 1:
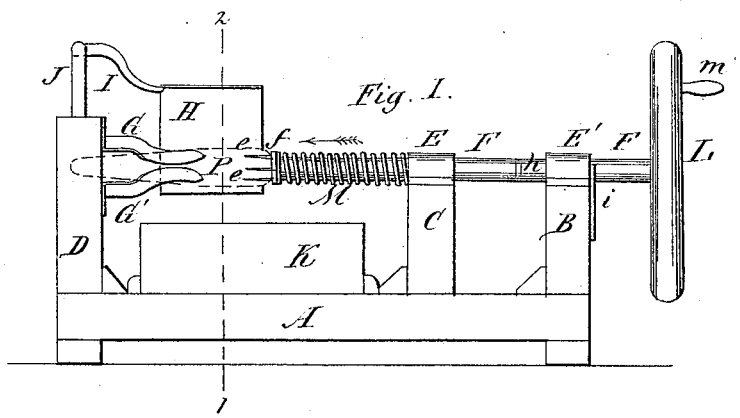
Figure 2:
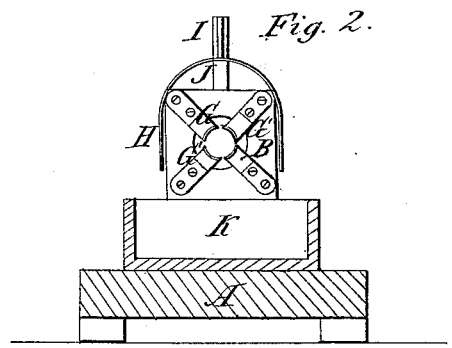
Figure 3:
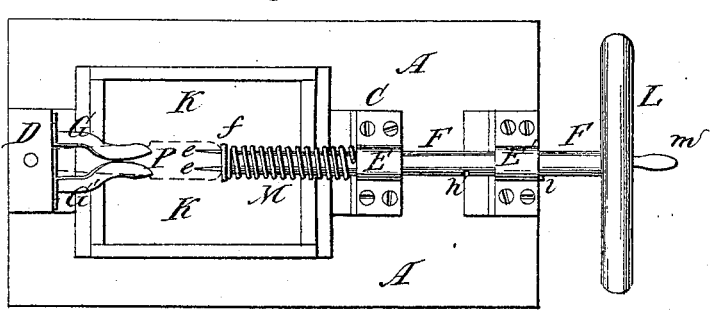

On reference to the drawing which forms a part of this specification, Figure 1 is a longitudinal elevation of my improved apparatus for cutting green corn. Fig. 2 a transverse section of the same on the line 1, 2, (Fig. 1). Fig. 3, a ground plan.

The same letters of reference allude to similar parts throughout the several views.

A is the base of the machine, to which are attached the three standards B, C, D.

On the top of the standards B and C are secured the boxes E and E' for receiving the spindle F. The latter is furnished at one end with a fly wheel L having a handle $m$, and at the other end with a collar $f$ from which project any convenient number of prongs $e$. Between the collar $f$ and the box E, and surrounding the spindle is a spiral spring M which has a tendency to force the spindle in the direction of the arrow when not otherwise retained by a spring catch $i$, which is secured to the outside of the standard B and which, when the spindle is drawn back to its farthest extent, drops into a notch $h$. In the standard D is a hole central with the spindle, and of size sufficient to allow the largest cobs of corn to pass through freely. On the edge of this hole are secured the four steel cutters G, G, and G', G'. These cutters are bent as seen in the drawing, and for some distance toward their points are hollow on the inside, so that the four cutters together will form a circular passage for the husk of the cob, after the corn is cut off, (see Fig. 2). At their bends the cutters are made thin and elastic so as to adapt themselves to the thinner or thicker portions of a cob, and to cobs of different sizes. The ends of the cutters are pointed, two of them G, G, having points with sharp serrated edges, and the other two G', G', having points with plain sharp cutting edges, the plain and serrated points being placed alternately. On the top of the standard D is secured the rod J, to the top of which is jointed the rod I carrying on its end an arched guard H of wire gauze or other suitable substance. K is a box for receiving the falling kernels of corn, and which is capable of being readily removed or replaced. Previous to operating the machine the guard H is thrown back from the position shown in the drawing, and the spindle is withdrawn, until the spring catch $i$ drops into the notch $h$. The thick end of a cob of corn P is then struck onto the prongs $e$, and its point directed toward the opening between the elastic cutters G and G', the guard H is then thrown down to its original position, and the spindle F turned rapidly by the wheel L, the very first movement of the spindle causing the spring catch $i$ to be released from the notch $h$ allowing the spiral spring M to force the spindle and with it the cob P, which are still rapidly turned, toward the points of the cutters G and G', and as the kernels are cut off by the latter forcing the husk through the circular space, intervening between the cutters, into the hole in the standard D from which it may be easily withdrawn after all the corn has been cut off. The same operation may be now performed on a second cob. Although not absolutely indispensable, the spiral spring M affords great facility to the operator, and gives a regular uniform pressure of the cob against the cutters. The yielding nature of the latter allows the smaller as well as the larger portion of a cob, as well as cobs of different sizes to be cleared of the corn, and at the same time they serve as a guide for the cob during the operation. The object of the guard H is to prevent the kernels during the rapid rotation of the cob from flying, and to direct them into the box K.

What I claim and desire to secure by Letters Patent is—

The spindle F with any convenient number of prongs e in combination with the yielding cutters G and G', the whole being arranged and constructed substantially, in the manner, and for the purpose herein set forth.

WILLIAM B. COATES.

Witnesses:
HENRY HOWSON,
WILLIAM E. WALTON.